United States Patent [19]

Dougherty

[11] Patent Number: 4,504,861
[45] Date of Patent: Mar. 12, 1985

[54] PORTABLE TV TRANSMITTER

[75] Inventor: Joseph P. Dougherty, White Haven, Pa.

[73] Assignee: EMCEE A Division of Electronics, Missiles & Communications, Inc., White Haven, Pa.

[21] Appl. No.: 349,961

[22] Filed: Feb. 18, 1982

[51] Int. Cl.³ .......................... H04N 7/04; H04N 5/40
[52] U.S. Cl. ..................................... 358/143; 358/186
[58] Field of Search .............. 358/186, 143, 146, 185, 358/229, 254, 906, 83, 209; 455/95, 100, 128

[56] References Cited

U.S. PATENT DOCUMENTS

| | | | |
|---|---|---|---|
| 2,402,091 | 6/1946 | Schade | 358/186 |
| 4,037,763 | 7/1977 | Turchen | 358/229 |
| 4,090,893 | 1/1978 | Camras | 358/83 |
| 4,168,511 | 9/1979 | Chabanel | 358/186 |
| 4,238,855 | 12/1980 | Zborowski | 358/186 |
| 4,258,387 | 3/1981 | Lemelson | 358/229 |
| 4,310,854 | 1/1982 | Baer | 358/143 |

OTHER PUBLICATIONS

20/2KW Transmitter for TV Band IV/V with UHF Power Tetrodes, by W. Gunther, Engineering Telcom Report 2, (1979), No. 4, pp. 266–271.
PCN-1200 Series VHF Television Transmitters, by S. Higashi, NEC Research & Development, No. 59, Oct. 1980, pp. 72–80.

Primary Examiner—Tommy P. Chin
Attorney, Agent, or Firm—John Kurucz

[57] ABSTRACT

A portable TV transmitter is provided on a harness. The transmitter may be carried by a person on the back thus leaving the hands free for operating a TV camera coupled with the transmitter. The transmitter is equipped with a multi-directional antenna, a rechargeable battery pack and a battery charger. The battery pack and charger may be removed during the charging operation.

21 Claims, 3 Drawing Figures

PORTABLE TV TRANSMITTER

BACKGROUND OF THE INVENTION

This invention relates to a portable television transmitter which is capable of sending signals directly to a television receiver without an intermediate station.

Over the past forty years the use of television equipment has increased tremendously. Initially all the television signals have originated from the controlled environment of a studio. Some relatively recent developments in transmission equipment have allowed the development of mobile studios but even these studios are severely limited. Typically when cameramen carry the TV cameras that are used to convert optical images into electronic signals the signals are either recorded on a video recorder or transmitted by cable to the mobil studio. In its turn the mobil studio sends the signals either via more cables or by air to a central location where they are processed and then are recorded and/or retransmitted to individual television receivers. It would be very useful to have a transmitter which could eliminate either one or both of the intermediate steps needed to get the signals from a remote location to a television receiver. It would be even more advantageous to have a transmitter small enough so that it could be carried by a person without any cumbersome cables.

OBJECTIVES OF THE INVENTION

The primary objective of the invention is to provide a device which can transmit signals to television receivers but it's light enough so that it can be carried by an individual.

Another objective of this invention is to provide a transmitter which has its built-in power supply.

Yet another objective of this invention is to provide a transmitter which can transmit signals selectively from a TV camera, a TV video camera or a video recorder.

A further objective of this invention is to reduce the power consumption of the transmitter while it's idle.

The other objectives and desirable features shall become apparent in the description set forth below.

SUMMARY OF THE INVENTION

Briefly, this invention provides a transmitter housing secured to a harness. The transmitter housing contains solid-state electronic circuitry, a power supply and a multi-directional antenna. A cameraman using this invention carries a portable TV camera in his hands, and the transmitter on his back.

The solid-state electronic circuitry comprises a means of receiving video signals from a video signal generator such as a TV camera, means for modulating the output of video signal oscillator by the video signals to produce processed video signals, similar means for modulating the output of an audio signal oscillator by the audio signals received from an audio signal generator, such as a microphone means of mixing the modulated audio signals with the output of the video signal oscillator to produce audio signals suitable for combining with the produced video signals, means for combining the produced audio signals with the produced video signals to produce combined television signals and means for transmitting the combined television signals to a television receiver and a power supply for the transmitter.

DESCRIPTION OF THE PREFERRED EMBODIMENT

This transmitter is a self-contained portable VHF television transmitter intended for use with a portable TV camera. It contains all the circuitry required to develop the sound and video carriers as well as the synchronization signals.

Figure 1:
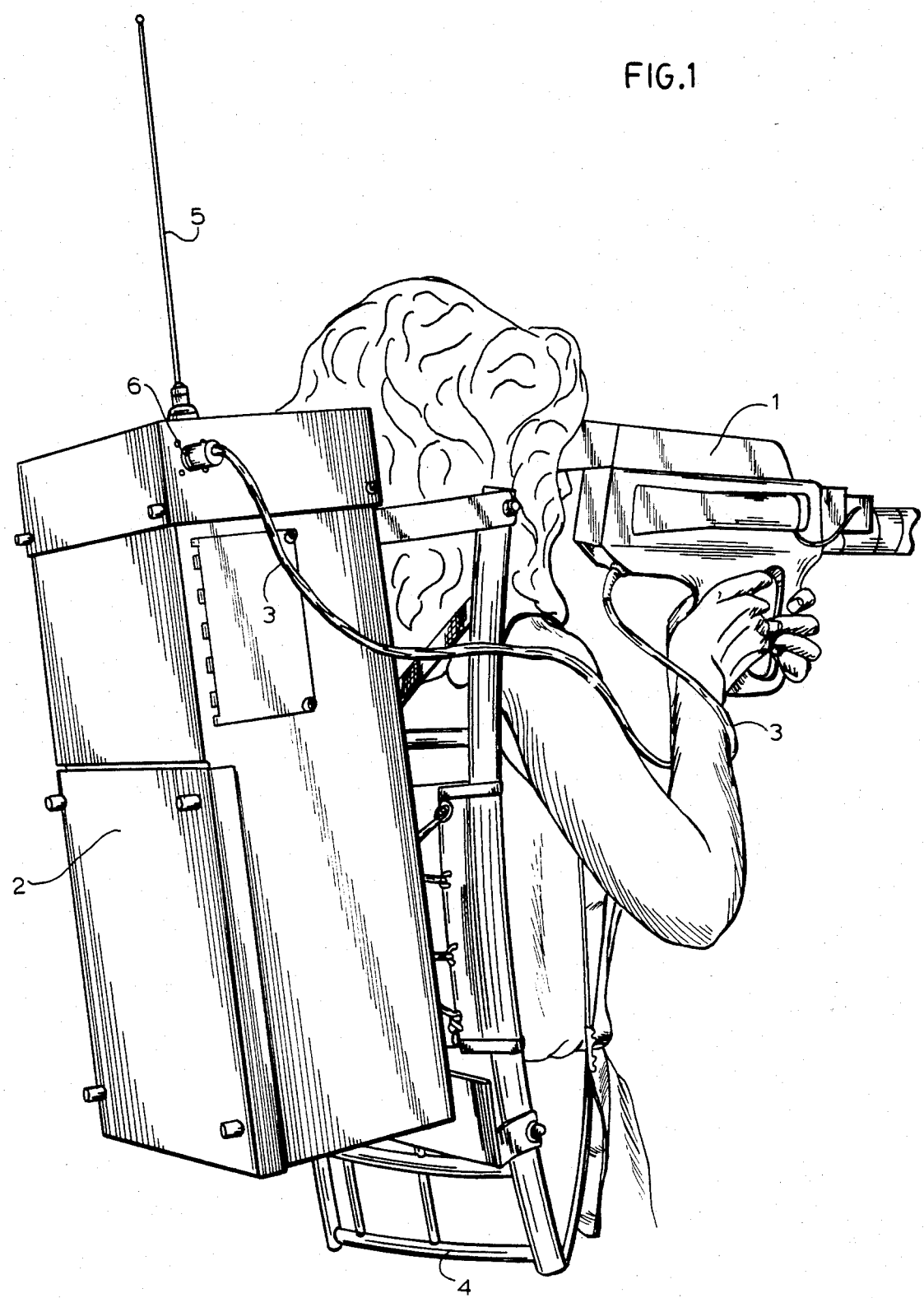
FIG. 1 shows the portable transmitter in use with a TV camera.

As shown in FIG. 1, a person using this portable transmitter together with a TV camera, can shoot with the TV camera 1 while carrying the transmitter 2 secured to harness 4. TV camera 1 is connected to transmitter 2 via a multi-conductor cable 3 connected to jack 6. The combined television signals are radiated from antenna 5. Notice that the antenna is multi-directional allowing the use of the transmitter in any position. In contrast, a mobile transmitter studio must point its antenna continuously towards the central location.

Figure 2:
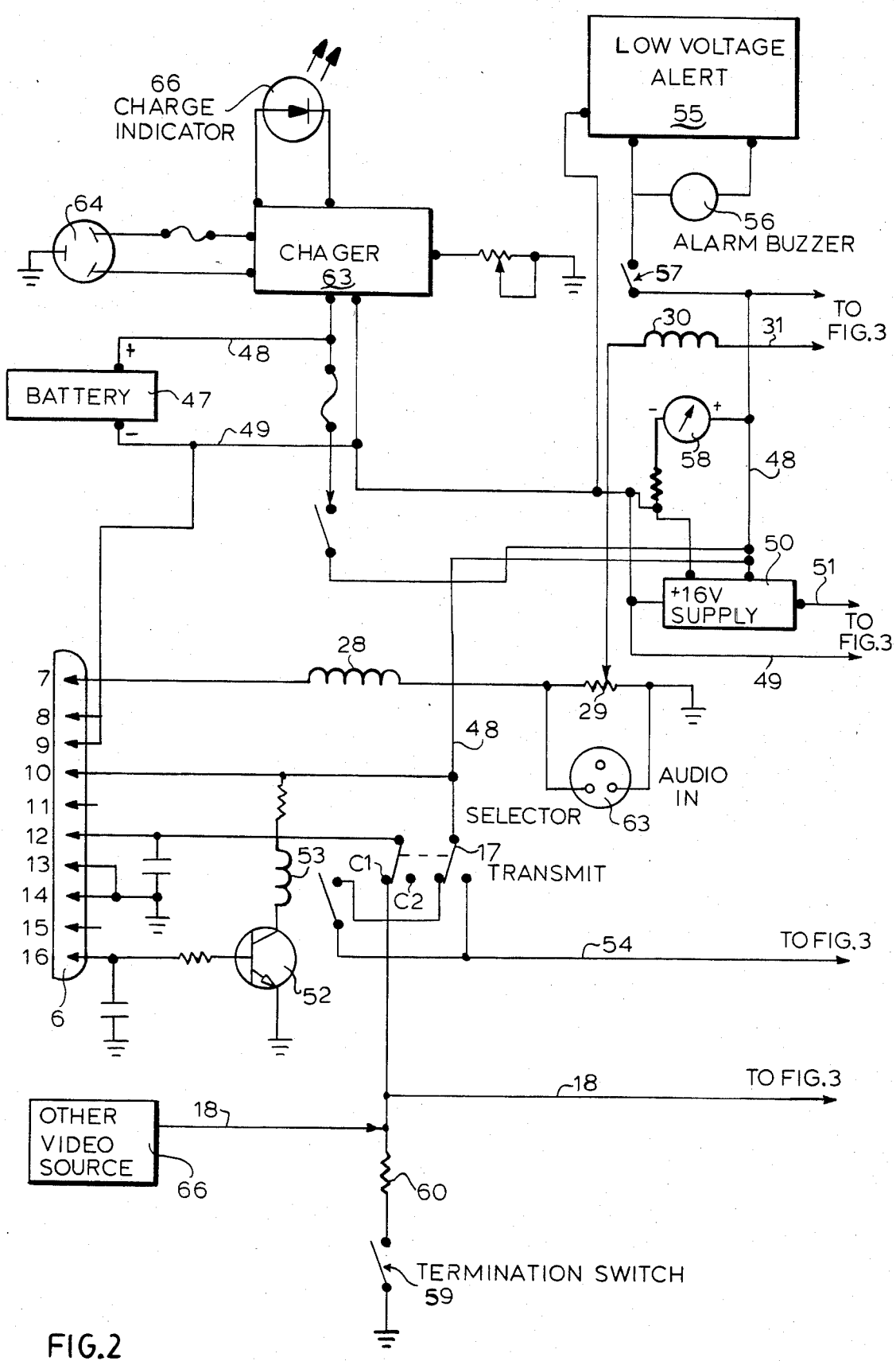
FIG. 2 shows the circuitry of the transmitter concerning incoming signals and the power supply portions.
Figure 3:
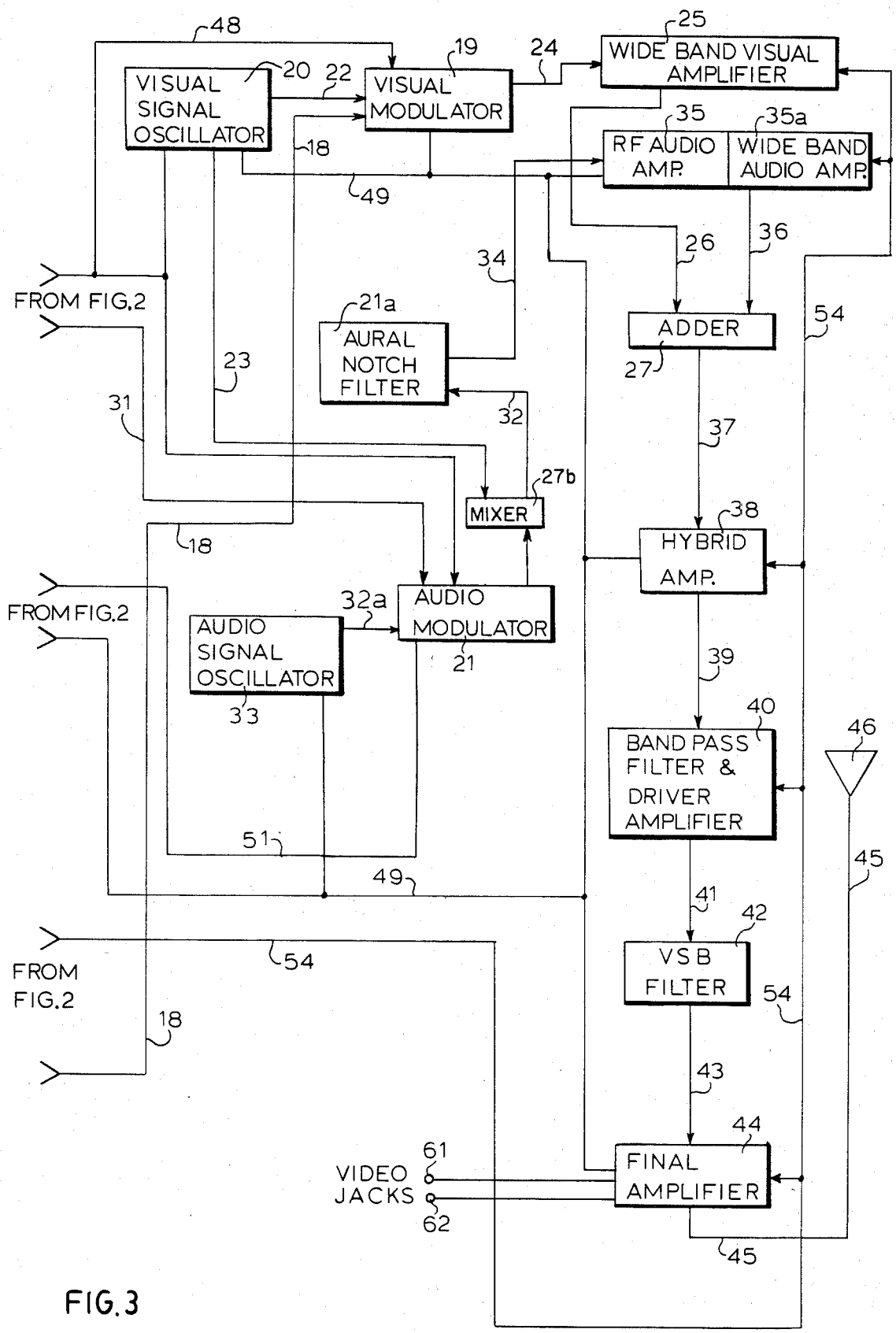
FIG. 3 shows the other circuits of the preferred embodiment.

The internal circuits of the transmitter can be seen on FIGS. 2 and 3, with FIG. 2 showing the connections to jack 6. Pins 10 of the jack provide 12 VDC to the TV camera with pins 13 and 14 as grounds. The video signals from the camera are received on pin 12 and fed via switch 17 and line 18 to the video modulator 19 on FIG. 3. The output from a crystal oscillator is multiplied and buffered in the Visual Signal oscillator 20 to produce the required VHF video carrier frequency. The video carrier frequency is then "fed" into a signal splitter with two outputs which are injected into a Visual Modulator 19 and an Mixer 21b on lines 20 and 23 respectively. Modulation of the Video Carrier is obtained from the video signal 18 produced by the output of the portable TV camera 1. The signal from the camera is inverted in the Visual Modulator 19. Processing of the video signal to provide the required $87\frac{1}{2}\%$ modulation, proper sync tip level and the required L.O. level to avoid compression of the video signal is done by controls within the visual modulator. The processed video signal of the Visual Modulator is sent via Line 24 to a wideband Visual Linear Amplifier 25. The output of the Visual Amplifier is then "fed" via 26 to the Adder Network 27 which functions as a resistive combiner.

The audio signals are received on pin 7 of jack 6 (FIG. 2) and fed thru coil 28; audio level control 29, and coil 30 into the audio modulator 21 via line 31.

An oscillator circuit 33 having a voltage controlled crystal oscillator is used to generate a 4.5 MHz audio oscillator signal on line 32a. This oscillator signal is modulated in audio modulator 21 by the audio signals received from pin 7. The output of the audio modulator is fed into a mixer 21b provided for mixing said output with the video oscillator signal from oscillator 20.

The mixed audio signal is fed on line 32 through a Notch Filter 21a which eliminates the lower audio sideband (4.5 MHz minus visual carrier frequency) and also the Visual Carrier Frequency. The audio signal (4.5 MHz modulated plus visual carrier frequency) is amplified by an Audio RF Amplifier 35 whose output is coupled directly to the input of a Linear Wideband Amplifier 35a and then sent via 36 to the Resistive Adder 27. The modulated visual carrier and the modulated audio carrier (4.5 MHz plus the visual carrier) are grouped together by the Adder. The composite TV signal obtained from the output of the Adder Network is then coupled via 37 to the Hybrid Amplifier and then to Bandpass Filter 40 via line 39 Driver Amplifier 44 via line 43, VSB Notch Filter 42 via line 41 and Final Amplifier. The Final Amplifier and Driver Amplifier increase the signal level to the proper output power level of 1 to 5 watts. The Bandpass Filter partially suppresses the lower sideband components of the video carrier and VSB Notch Filter further suppresses the lower sideband components of the composite TV signal. The output of the Final Amplifier is coupled to a Harmonic Antenna 46 via line 45 (a shorted ¼ wavelength line) which attenuates the 2nd harmonic output of the transmitter.

Power for the transmitter is supplied by the 12-V battery 47, buses 48 (+) and 49 (— or ground). A 16-V supply 50 is included to provide that voltage via 51 to the audio modulator 21.

Conservation of the battery is provided by a trigger switch associated with the portable TV camera. Depressing the trigger of the camera applies power to the Linear Amplifier 40, and the Final RF Amplifier 44. Except for these rf amplifier stages, power is applied continuously to all of the circuitry within the portable VHF transmitter. This power switching is accomplished by switching transistor 52 on or off. The base of the transistor is connected to the trigger of the TV camera thru pin 16 of jack 6. When the transmitter is on it energizes relay 53 providing 12-V on line 54.

During actual operation of the transmitter, the voltage output level of the battery is monitored by a Low Voltage Alert circuit 55. The alert circuit activates an alarm buzzer 56. The circuit is energized when the ALARM switch (57) is placed to ON. This same condition of the battery being in a state of discharge is noted by the BATTERY meter (58). When the pointer of the BATTERY meter is indicating below a green shaded area, the operator is informed that the battery has discharged beyond its intended operating range. The Transmitter has a TERMINATION switch 59 which is placed in the closed position when operating with a single Video Generating Device such as a portable TV camera or a video Cassette recorder. When the Transmitter is operated with a single Video Generating Device, a 75 ohm internal load 60 is switched across the video input circuitry of the Visual Modulator 19 by switch 59. The switched-in 75 ohm resistor 60 provides the proper matching for the video input circuitry of the Visual Modulator. When the Transmitter is operated with a Video Recorder and TV camera simultaneously, no internal attenuator is required and the switch 59 is placed in the open position. The Transmitter has a pair of test jacks labeled DETECTED VIDEO (61 and 62) which are connected to the final rf amplifier 44 and are used to monitor the composite TV signal produced by this amplifier. These jacks are used by the equipment operator when adjusting the video output level of the portable camera or any other video generating equipment that may be used in conjunction with the Transmitter. During this adjustment the operator also ensures that the sync information and video information is being reproduced in the proper ratio and that the sync information is not compressed. The Transmitter has an AUDIO IN jack 63 which is normally used when the transmitter is not used in conjunction with the portable TV camera. This jack is used when the transmitter is connected to some type of video generating equipment other than the portable TV camera designated for use with the Transmitter. When operated in this system configuration, the audio signal from the microphone is adjusted to the proper level by the transmitters AUDIO LEVEL control 29. The AUDIO LEVEL control is also used to adjust the audio signal obtained from the output of the portable TV camera or externally connected microphone. Proper setting of this control provides a carrier deviation of the aural signal of 25 kHZ.

Battery 47 is a 17 pound high-efficiency, permanently sealed battery. The battery is rated at 20 amperes/hours and in normal use will function for a 12 hour operating period. At the end of each day, charging of the battery is required. The normal time to recharge the battery is 1.5 hours of charging time for every one (1) hour of battery use. The Portable Transmitter has its own battery charger 63 which is an integral part of the Battery Assembly. The Battery Assembly is a separate part of the Transmitter and is seated within the transmitter so that it can be easily removed to facilitate charging at the end of an operating day. The charger is energized by plugging the ac power plug 64 into 117 volt ac power source. The charging rate of the battery is adjusted by the CHARGE RATE control 65 which is located within the Battery Assembly. During the charging period, the CHARGE RATE lamp 66 is illuminated. The relative brightness of the lamp is an indication of the rate of the battery charge. A transistorized circuit senses when the battery has attained a fully-charged condition and automatically discontinues the charging cycle.

All the components of the transmitter could be connected to a common bus which then would be energized by the trigger switch of the TV camera.

Having set forth the general nature and preferred embodiment of the present invention, the true scope is now particularly pointed out in the appended claims.

What is claimed is:

1. A portable TV transmitter comprising:
    means for receiving video signals from a first video signal generator;
    a video signal oscillator which produces video oscillator signals at a select frequency;
    means for modulating the video oscillator signal by the video signals to produce processed video signals;
    means for receiving audio signals from an audio signal generator;
    an audio signal oscillator which produces an audio oscillator signal;
    means for modulating the audio oscillator signal by the received audio signals to produce modulated audio signals;
    means for mixing the video oscillator signals with the modulated audio signals to produce processed audio signals;
    means for combining the processed audio signals and the processed video signals to produce composite television signals;
    means for emitting the composite television signals; and means of providing power for the transmitter.

2. The portable TV transmitter of claim 1 wherein the first video signal generator is a TV camera.

3. The portable TV transmitter of claim 2 also comprising a first amplifying means to amplify the processed video signals before they are combined with the processed audio signals.

4. The portable TV transmitter of claim 3 also comprising a second amplifying means to amplify the processed audio signals before they are combined with the processed video signals.

5. The portable TV transmitter of claim 4 also comprising a third amplifying means for amplifying the composite television signals.

6. The portable TV transmitter of claim 5 also comprising a means of filtering said composite television signals before transmission to eliminate or suppress undesirable components of the composite television signals.

7. The portable TV transmitter of claim 6 also comprising of means of receiving video signals from a second video signal generator.

8. The portable TV transmitter of claim 7 wherein said second video signal generator is a second TV camera.

9. The portable TV transmitter of claim 7 wherein the second video signal generator is a video recorder.

10. The portable TV transmitter of claims 8 or 9 wherein said means for modulating the video oscillator signal is adjustable.

11. The portable TV transmitter of claim 10 also comprising means for monitoring the composite television signals being emitted by the transmitter.

12. The portable TV transmitter of claim 11 wherein the means of providing power comprise a plurality of battery cells.

13. The portable TV transmitter of claim 12 wherein said batteries get discharged during the operation of the TV transmitter and also comprising means for indicating that the batteries are discharged.

14. The portable TV transmitter of claim 13 wherein said batteries are rechargeable.

15. The portable TV transmitter of claim 14 also comprising a means of charging said rechargeable batteries.

16. The portable TV transmitter of claim 15 wherein the rechargeable batteries and the battery charging means are removable from the transmitter during the charging of the batteries.

17. The portable TV transmitter of claim 16 wherein the battery charging means comprise means of indicating that the batteries are charged to an acceptable level.

18. The portable TV transmitter of claim 11 wherein said first or second video signal generator comprises a powerswitching means connected to said power providing means so that when said switching means is activated, the first, second and third amplifying means receive power from said power providing means.

19. The portable TV transmitter of claim 18 wherein said transmitter receives power when said power switching means is activated.

20. The portable TV transmitter of claim 1 wherein said means for emitting the television signal comprise an antenna.

21. The portable TV transmitter of claim 20 wherein said antenna is multi-directional.

* * * * *